United States Patent [19]

Howard et al.

[11] Patent Number: 5,143,687
[45] Date of Patent: Sep. 1, 1992

[54] RAPID CHANGE WEDGE CHUCK WITH POSITIVE LOCK

[75] Inventors: Carl J. Howard, Kingsley; Donald J. Wrobel, Traverse City, both of Mich.

[73] Assignee: Sheffer Collet Company, Traverse City, Mich.

[21] Appl. No.: 652,125

[22] Filed: Feb. 7, 1991

[51] Int. Cl.⁵ ............................................. B23B 31/16
[52] U.S. Cl. ..................................... 279/123; 279/110
[58] Field of Search ................. 279/1 ME, 110, 121, 279/123, 111-120, 122

[56] References Cited

U.S. PATENT DOCUMENTS

| | | | |
|---|---|---|---|
| 3,606,364 | 9/1971 | Benjamin et al. | 279/110 X |
| 4,243,236 | 1/1981 | Röhm | 279/110 |
| 4,243,237 | 1/1981 | Röhm | 279/110 X |
| 4,270,763 | 6/1981 | Röhm | 279/110 X |
| 4,969,654 | 11/1990 | Theodolin | 279/110 X |

FOREIGN PATENT DOCUMENTS 3437505  5/1985  Fed. Rep. of Germany ...... 279/110

Primary Examiner—Steven C. Bishop
Attorney, Agent, or Firm—Price, Heneveld, Cooper, DeWitt & Litton

[57] ABSTRACT

Each of the jaws of a sliding jaw chuck are moved between workpiece clamping and release positions by a post, the end of which, in active position, is seated in an opening in an octogonal plate seated in a recess in the jaw. The plate is octagonal and its dimensions are such that it always entirely occupies the recess in the direction of movement of the jaw. In contrast, the recess is wider than the plate, permitting the plate, after removal from the recess, to be rotated about the post to any one of five positions. While the plate is symmetrical about its geometric center, the opening for the post is offset from the plates's center which results in changes in the spacing between the post and the ends of the recess, which controls the radial position of the jaw with respect to the axis of rotation of the chuck and thus the size of the workpiece which it can clamp.

10 Claims, 4 Drawing Sheets

RAPID CHANGE WEDGE CHUCK WITH POSITIVE LOCK

SUMMARY OF THE INVENTION

The chuck of this invention has workpiece holding jaws mounted on jaw supports which have very limited radial movement between clamp and release positions. However, by means of incremental rotation of a polygon positioning ring the radial position of the jaws in their closed and release positions can be changed without changing the amount of movement of the jaw between these positions. The change from one range to another can be accomplished quickly without specialized tools.

BACKGROUND OF THE INVENTION

This invention relates to chucks for machine tools designed either for high-speed operation or machining operations in which the chuck must sustain severe lateral forces due to the machining pressures exerted on the workpiece. In either case, it is essential that the workpiece be positively held and that the grip on the workpiece is capable of positively resisting any forces, such as centrifugal forces, which would tend to cause it to loosen its grip on the workpiece. This latter requirement has become much more urgent and meaningful as both the operating speed and the pressure exerted by the tools on the workpieces have been increased.

The problem has been to satisfy the need for better and more positive engagement with the workpiece without materially increasing the cost of the chuck or limiting its utility.

Heretofore chucks designed for the service conditions to which this invention is designed to be applied have been limited to a very small jaw movement capability. As a result, the chucks have a highly specialized and limited use and are not adaptable to use with workpieces of any significant range of dimensional difference without a long and complicated rework adjustment of the chuck. Since such chuck adaptation work must be done by skilled personnel, the cost of adaptation of the chuck from one job to another has been prohibitive unless the length of the run on which the chuck is to be used is of sufficient size that the cost of adaptation can be absorbed.

This invention overcomes this difficulty by providing means by which such chucks can be quickly adapted to serve a much wider range of workpiece sizes with a minimum downtime requirement and without the necessity for use of highly skilled labor to perform the changeover. In fact, with this invention, the changeover can be made be so rapidly that there is no reason to attempt to use the machine on which the chuck has been mounted for any other purpose while the changeover is being made. Further, this permits the chuck to be used for a much wider range of work and, thus, for a much higher proportion of its availability. Thus, its cost can be amortized over a much larger proportion of availability time. Further, it reduces the number of chucks which a firm must have on hand in order to profitably machine a wide range of jobs. It reduces the amount of machine tool downtime necessary for changeover from one job to another. Since each chuck can be used over a much wider range of jobs, the necessity for providing storage space for chucks not currently in use is significantly reduced. Overall it significantly increases the scope of the jobs a machine shop can profitably perform on each of its chucks. Thus, the chuck's return on capital is materially increased and the amount of storage space required for idle chucks is significantly reduced.

DESCRIPTION OF THE PREFERRED EMBODIMENT

Figure 1:
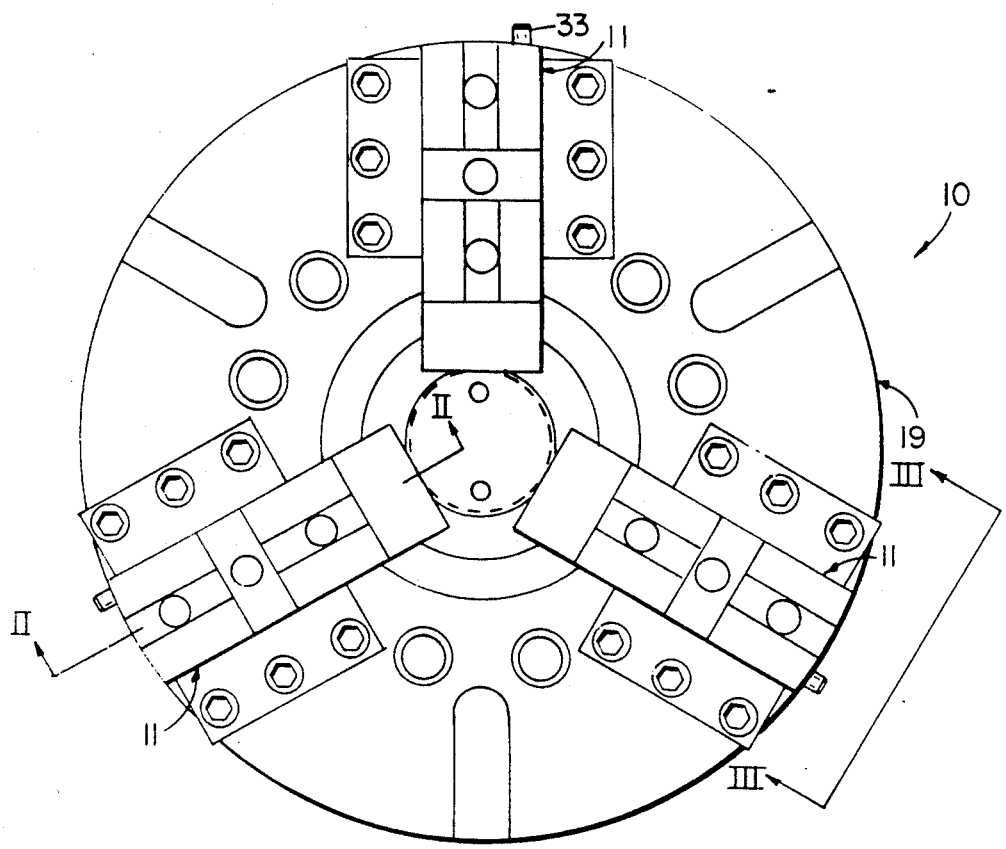
FIG. 1 is a front face view of a three-jaw chuck of the type to which this invention can be applied.
Figure 3:
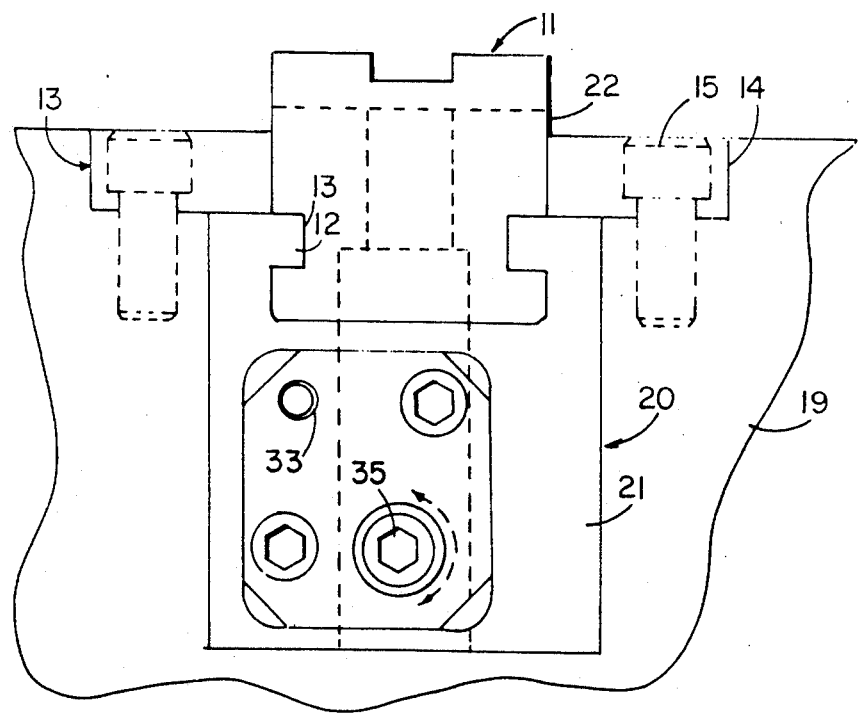
FIG. 3 is an enlarged, fragmentary, elevational view taken along the plane III—III of FIG. 1.
Figure 2:
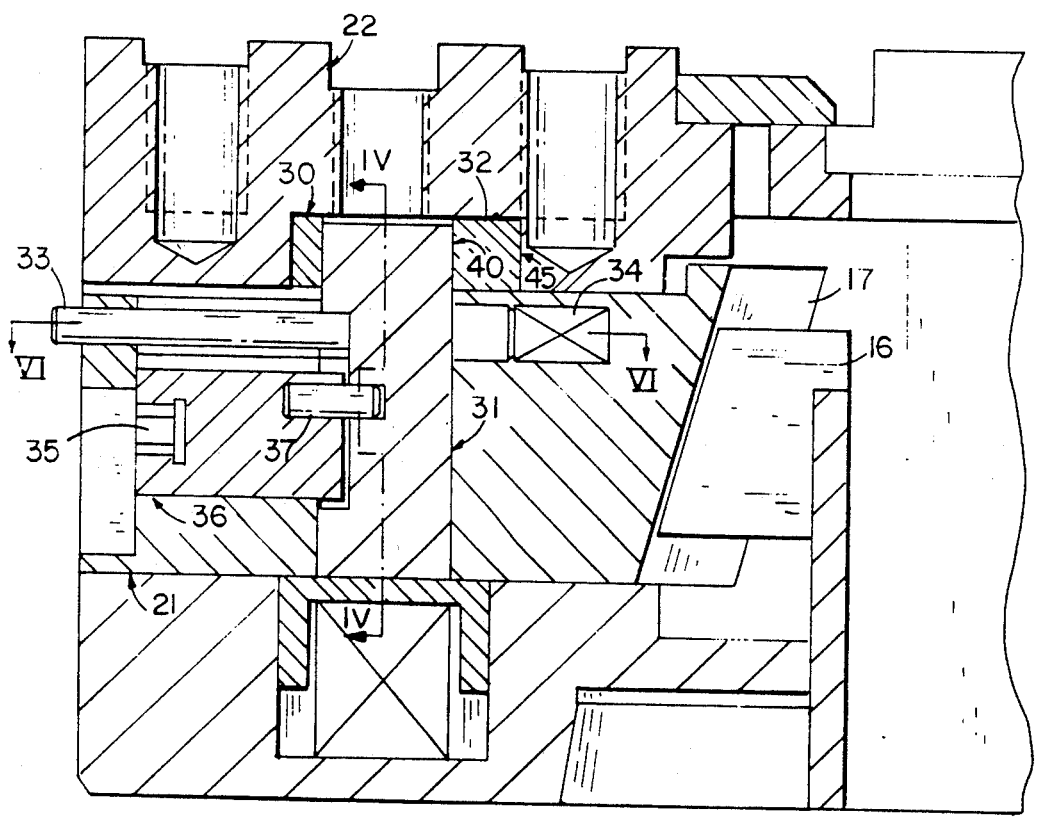
FIG. 2 is an enlarged sectional elevation view of one of the jaws, taken along the plane II—II of FIG. 1 with cross sectioning omitted for clarity.

Referring specifically to FIGS. 1 and 3, a typical chuck 10 is illustrated, having mounted thereon three radially jaws 11 which are radially slidable in the chuck body 19. The chuck body has radially extending jaw openings 20 each slidably seating one of the jaws 11. Each jaw has an inner member 21 and an outer member 22. The outer member provides a base on which the fingers which actually grip the workpiece are mounted. The outer member is slidably seated between a pair of rails 12 which seat in the radially extending slots 13 of the outer member 22 (FIG. 3). The jaws 11 are further guided by the side members 14 which are recessed into the outer face of the chuck and held by the cap screws 15. The chuck, as illustrated, has three of these jaws 11 which is a conventional arrangement but, for the purpose of this invention, the chuck can have additional jaws, as may be considered necessary. The actual work gripping fingers, which engage the part to be machined, are not illustrated since they are conventional and will be adapted to the shape of the particular part to be machined. The jaws 11 are designed to move radially a short distance for the purpose causing the gripping fingers to either engage or release the workpiece to be machined. This movement is effected by axial movement of the jaw actuator 16 which engages the inclined slide 17 at the radially inner end of the jaw (FIG. 2). This type of jaw actuation is not described in detail since it is conventional and, while this invention cooperates with it, it is not part of the invention.

Figure 4:
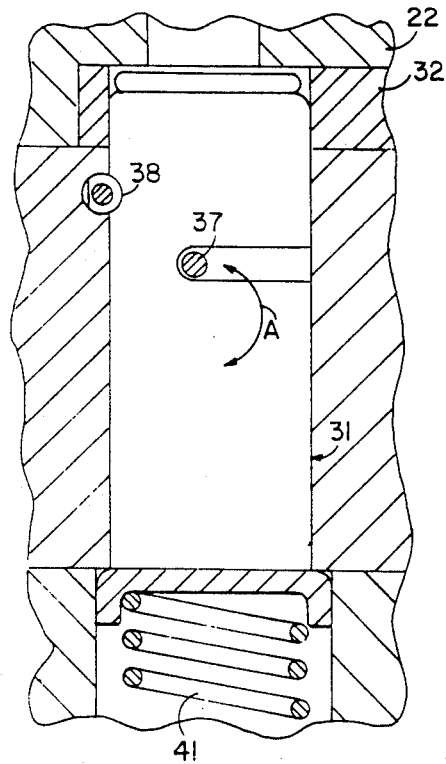
FIG. 4 is a fragmentary, sectional view taken along the plane IV—IV of FIG. 2 with the stop member for the chuck in outwardly advanced, jaw engaging position.
Figure 5:
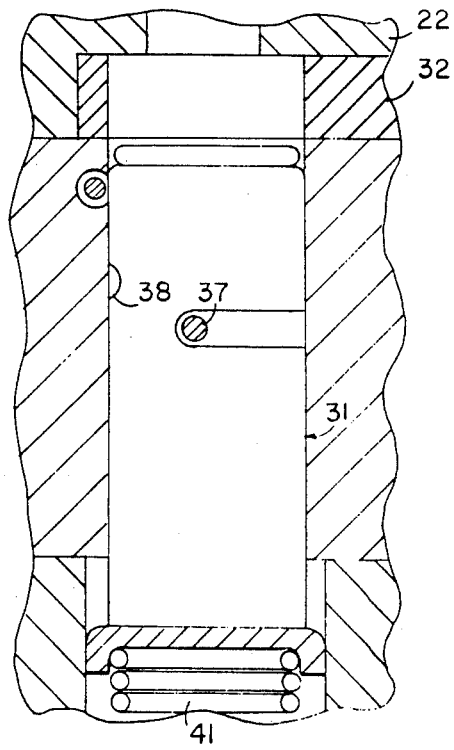
FIG. 5 is a view similar to FIG. 4 but showing the stop member in retracted position.

Each of the jaws' outer members 22 has a recess 30 in its inner face (FIG. 2). As the jaw 11 moves radially inwardly it transports with it the post 31 and the adjustable jaw positioner 32 which is seated in the recess 30 and surrounds the upper end of the post 31 when that post is in its extended position. During this movement, the post 31 is held against rotation about its central axis by the pin 33 which is urged into locking position by the spring 34 (FIGS. 2, 4, and 5). The post 31 projects into a close fitting opening 40 in the adjustable jaw positioner 32, providing a positive stop against radial retraction of the outer jaw member relative to the inner jaw member 21 which member, in turn is locked by its engagement with the jaw actuator 16. The plane along which the slide and jaw clamp engage is at an angle to the axis of chuck rotation such that forces of great magnitude would have to be generated in order to induce any outward movement of the jaw and its supporting structure. This would require forces in excess of those generated, even in high speed chucks.

Figure 12:
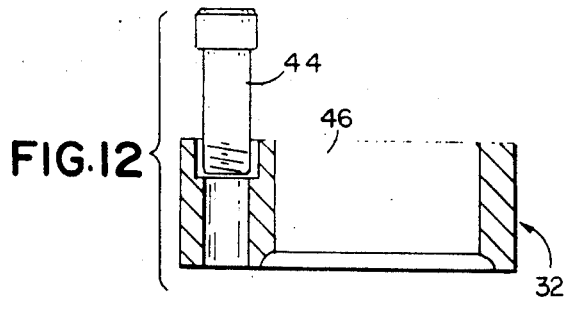
FIG. 12 is an exploded, enlarged, central section view of the jaw positioner.
Figure 6:
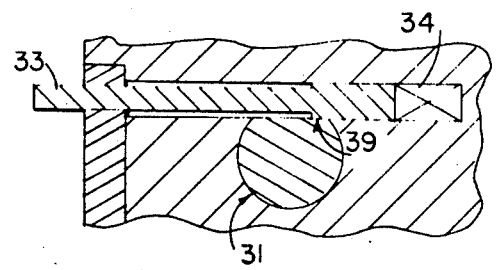
FIG. 6 is a fragmentary sectional view taken along the plane VI—VI of FIG. 2.

It is important to this invention that, despite the positive lock which the pin 33 effects against any possible axial movement of the post during machine operation, the invention does provide for a quick release when it is time to make adjustments that are necessary to adapt the jaws to clamp a workpiece which is larger or smaller than the limits of movement of the jaws as then assembled. To effect a change, a tool, such as an Allen wrench, is engaged in the opening 35 (FIGS. 2 and 3) in the lock member 36. The pin 33 is then depressed against the spring 34 to displace the enlarged end of the pin from the slot 38 in the side of the post 31. The lock member 36 is then rotated to shift the pin 37, as indicated by the arrow A in FIG. 4 to the retracted position (FIG. 5). This effects retraction of the post 31 against the spring 41 sufficiently to release jaw 11. Once this has been done, the outer jaw member 22 can be removed radially by sliding it out from under the side members or jaw clamps 14, after they have been loosened. The inner member 21 of the jaw will remain since it is held by the jaw actuator 16. With the outer jaw member removed, the adjustable jaw positioner 32 can then be rotated to change the radial position of the jaw both when it is fully opened and when it is fully closed to one which will accommodate the workpiece with which the chuck is next to be used. Obviously, this could be either a radial inward or a radial outward repositioning, depending upon the size of the new part to be machined. With the outer jaw member 22 removed and inverted, this change is effected simply by removing the anchor screw 44 holding the jaw positioner plate 32 (FIG. 12) and rotating the plate to a position in which the spacing between the post 31 and the wall 45 forming the inward end of the recess 30 will position the jaw radially of the chuck such that it can accommodate the new workpiece.

Figure 7:
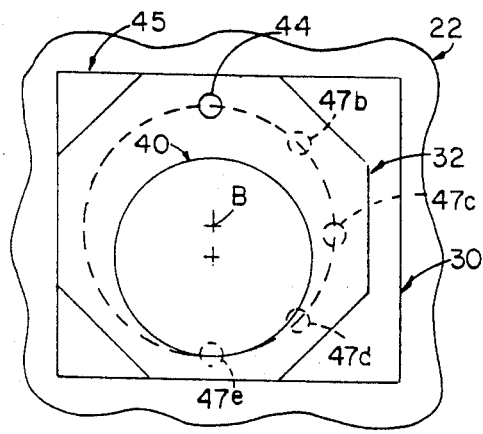
FIGS. 7-11 are enlarged, fragmentary views of the adjustable jaw positioner plate with each Fig. illustrating it in a different position as it is rotated clockwise.
Figure 8:
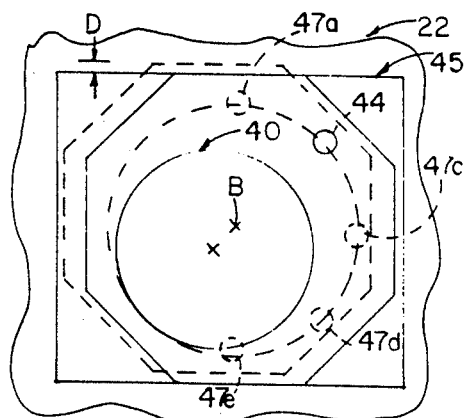
Figure 9:
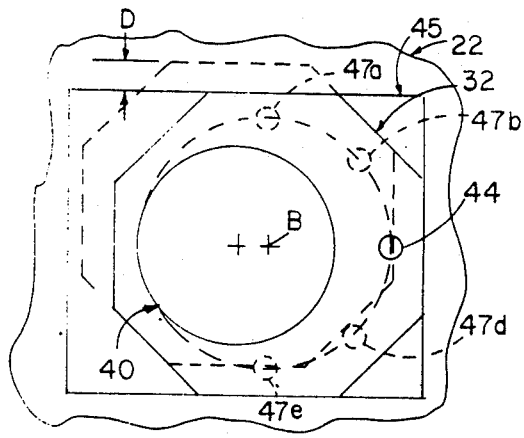
Figure 10:
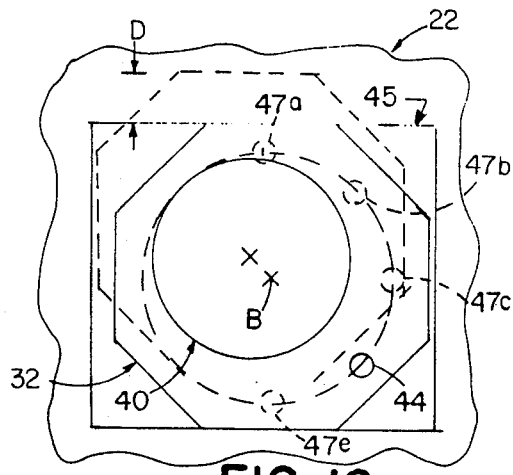
Figure 11:
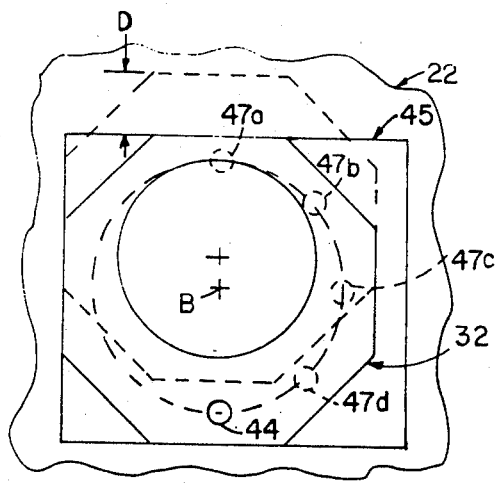

Use of the adjustable jaw positioner plate 32 to adjust the chuck's workpiece clamping capacity is illustrated in FIGS. 7-11 in all of which Figures chuck centerline is in direction of arrow "E". The recess 30 in which the plate 32 is seated is just long enough, lengthwise of the outer jaw member 22, to receive the plate 32. This recess, however, is wider than the plate 32 to permit the plate to be rotated as illustrated in FIGS. 7-11. Because the plate's post opening 40 for the post 31 is eccentrically located in the plate, as the plate is rotated about the post opening 40 through each 45° of arc to seat a different edge of the plate against the inner wall 45 of the recess 30, the distance between the post 31 and the wall 45 will be changed. Since the radial position of the post 31 is fixed, the change in the radial position of post 31 in relation to the wall 45 will change, as will be observed from study of FIGS. 7-11 and indicated by the letter "D". To anchor the plate 32 in each of its five possible positions, a threaded opening in the jaw 11 is provided for the anchor screw 44 at each of the 45° intervals of arc as indicated by the openings 47a-e in the FIGS. 7-11. These openings are arranged concentrically of the periphery of the positioner plate 32 and, thus, are concentric about the plate's geometric center B (FIG. 7). These openings, however, are eccentric of the opening 40 for the post 31.

Once the plate 32 has been repositioned as needed to accommodate the new workpiece to be machined, the plate is locked in the appropriate position by installation of a fastener such as the cap screw 44 in the appropriate one of the openings 47a-e (FIGS. 7-11).

It will be recognized that the number of adjustments which can be made is dependent on the number of sides with which the jaw positioner is provided. In the particular form illustrated, the positioner has eight sides, providing it with a total of five different positions. It could be limited to four sides and have four different positions of adjustment. It could also be changed to have sixteen sides and, thus, have eight positions of adjustment. The limit is basically controlled by the fact that the faces of the jaw positioner which seat inwardly against wall 45 of the inner end of the opening 30 must be capable of withstanding the forces generated by the tools without wear or metal deflection or migration so that the unit becomes inaccurate. The determining factor of this will be the type of steel which is used and the type of hardening to which the steel is subjected to withstand the unit pressures which will be created by the limited bearing surface on the sides of the plate which must be capable of sustaining both the work clamping pressure and the centrifugal force generated by chuck's rotation.

The engagement between the inner edge of the plate 32 then adjacent the center of the chuck with the inner wall 45 of the recess 30 provides a positive stop for the jaw rigidly holding it against any radially outward movement. This is important because it must serve as a reliable stop against any outward creep of the jaw due to centrifugal force generated by operation of the machine tool on which the jaw is mounted. This is very important because of the high centrifugal forces generated by the increasing higher operating speeds used in today's machining operations. At the same time, it permits the chuck to be quickly adapted to accommodate a substantially greater range of workpiece sizes and the adaptation requires no special training or skills.

It will be recognized that the invention provides a relatively inexpensive and relatively easy means by which high-performance, precision chucks can be adapted to accept a much wider range of workpiece sizes than has heretofore been available. Further, not only does the invention provide a means by which the necessary adjustments from one size workpiece to another can be quickly and readily made, it eliminates the necessity for highly skilled operators to make the changeover. The speed with which the chuck can be adapted from one workpiece size to another is such that there is no significant down-time involved in adaptation of the chuck from one operation to another. Thus, chucks having a very reliable capacity for holding the workpieces can, for the first time, be used in a much wider range of workpiece sizes by means which are suited to rapid adaptation to different products using relatively inexpensive means to accomplish it.

Applicant, having described a preferred embodiment of the invention, respectfully submits that other embodiments of the invention can be developed within the framework of applicant's disclosure and such embodiments are to be considered as included within the claims unless the hereinafter appended claims contain limitations which state expressly otherwise.

We claim:

1. The improvement in a chuck equipped with jaws, said chuck having a body equipped with radially extending recessed guideways opening through the circumferential face of the chuck body along which the jaws can be slidably moved radially of the chuck body, each jaw having an inner member and an outer member, said outer member having a rectangular cavity recessed into its rear face, said cavity having a pair of spaced apart parallel end walls extending transversely of the jaw support and perpendicular to a radius of the chuck body and a pair of spaced apart side walls, a plate having at least two pairs of parallel walls seated in said cavity, a circular hole recessed in said plate, the center of said hole being centered on an axis which itself extends between the centers of two parallel sides and passes through the geometric center of said plate said hole being offset along said axis from said plate's geometric center, stop means having one end of a size and shape to closely and slidably seat in said recessed hole in said plate with the radial position of said jaw being determined by which side of said pair of parallel surfaces are positioned to seat against the end surface of said cavity adjacent the center of said chuck.

2. The improvement in sliding jaw chucks as described in claim 1 wherein said plate has a pin opening therethrough paralleling said circular opening and adjacent the side of said plate spaced furthest from said circular opening, a plurality of pin receiving openings in said jaw support arranged in a semicircle centered about the geometric center of said plate, said openings being circumferentially spaced apart the same distance as the radial centerlines of the sides of said plate.

3. The improvement in sliding jaw chucks as described in claim 1 wherein said plate is an octagon and said openings are five in number arranged along an arc of 180° of uniform radius centered about the geometric center of said plate.

4. The improvement in sliding jaw chucks as described in claim 2 wherein both said pin and each of said openings are threaded to secure said plate in the selected position.

5. The improvement in sliding jaw chucks as described in claim 1 wherein said plate is an equal lateral polygon.

6. The improvement in sliding jaw chucks as described in claim 1 wherein said stop means is a part of circular cross section, means for reciprocating said stop between erected position seated in said recessed hole and retracted position withdrawn therefrom.

7. The improvement in sliding jaw chucks as described in claim 6 wherein a lock member is provided having means which in a first position engages said post to prevent the post's axial movement, and in a second position disengages said post to release the post for axial movement, said lock member having means accessible from the exterior of said chuck body for shifting said lock member between said positions.

8. The improvement in sliding jaw chucks as described in claim 7 wherein resilient means are provided biasing said means into said one position.

9. The improvement in sliding jaw chucks as described in claim 6 wherein a lock member is provided having means which in a first position engages said post to prevent the post's axial movement, and in another releases said post, said means being manually moveable between said first and second positions.

10. The improvement in sliding jaw chucks as described in claim 9 wherein means are provided to resiliently bias said lock member into post engaging position.

* * * * *